INVENTORS
JOHN M. MCLAUCHLAN
MONTY M. MERLEN
BY
*Robert Amer*
ATTORNEY

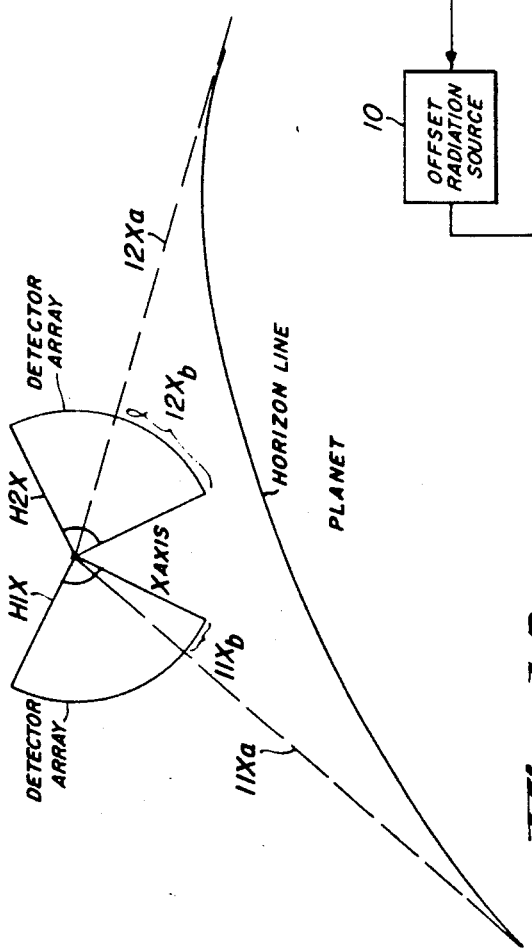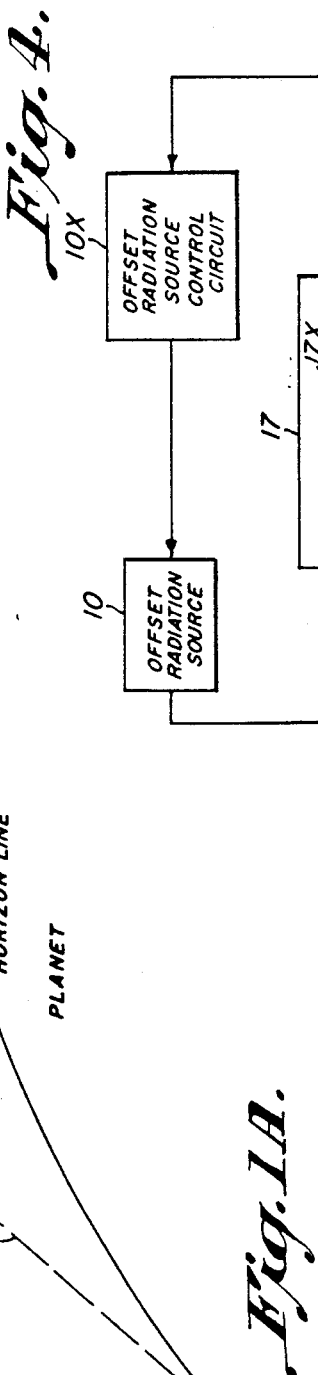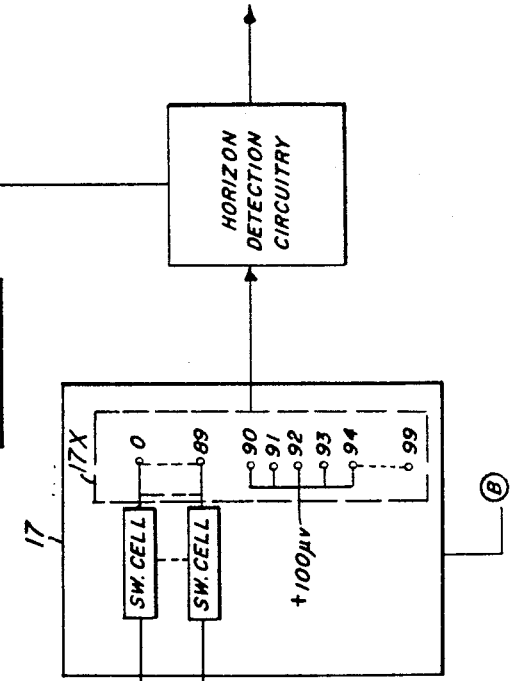

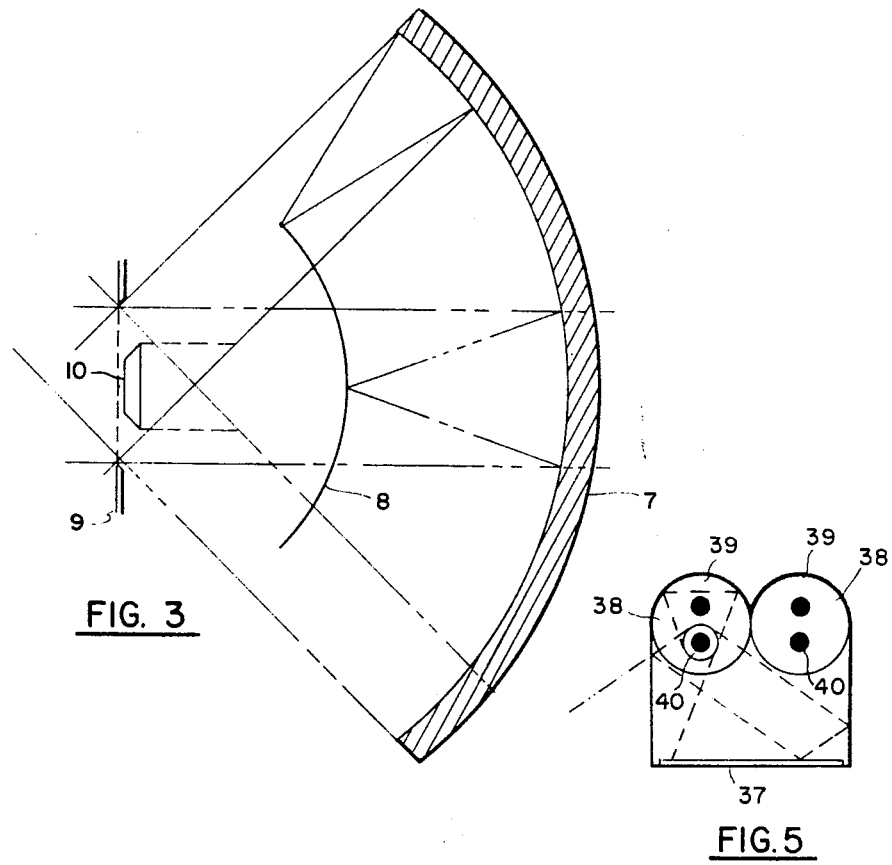

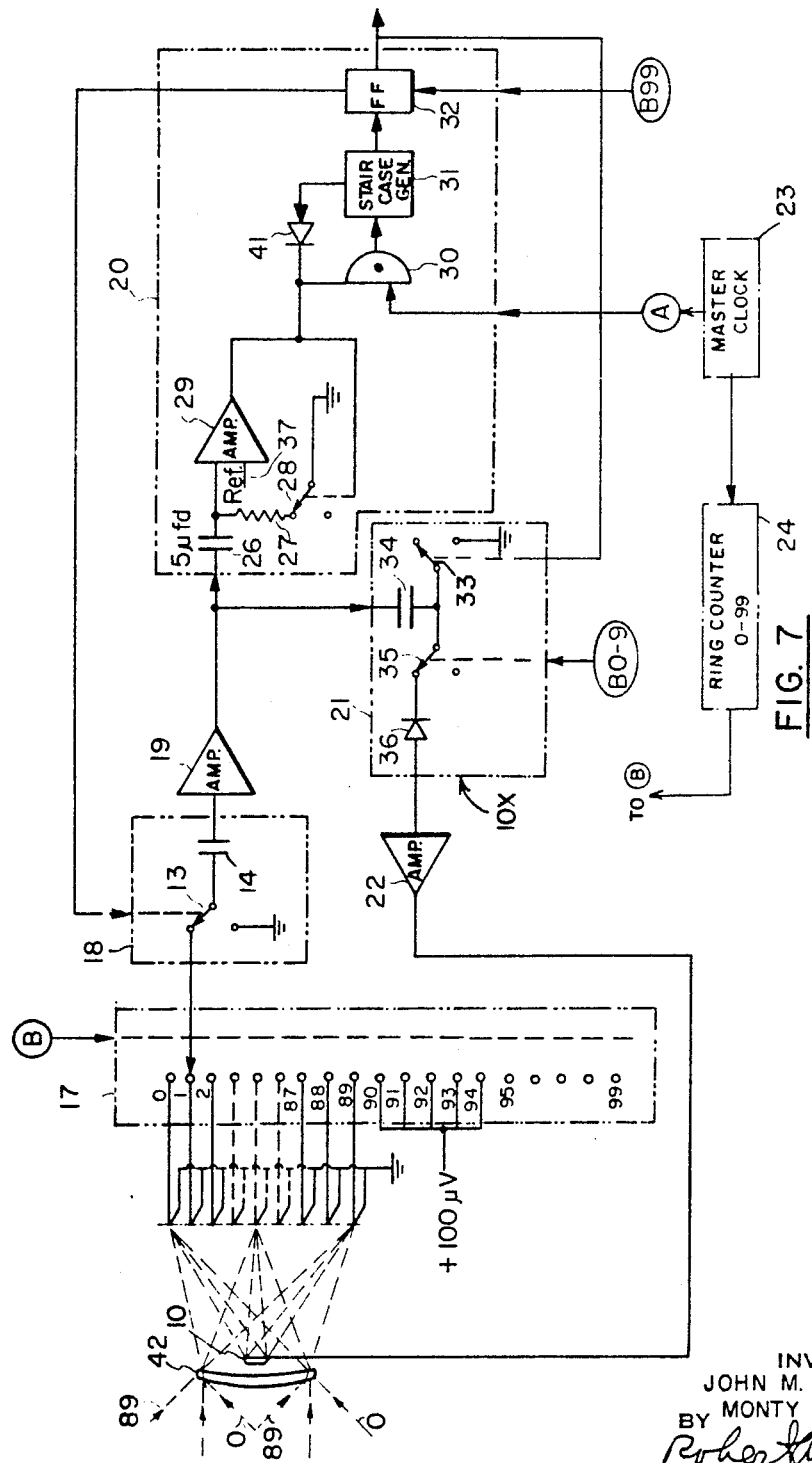

United States Patent Office 3,348,048
Patented Oct. 17, 1967

3,348,048
HORIZON SENSOR WITH A PLURALITY
OF FIXEDLY-POSITIONED RADIATION-
COMPENSATED RADIATION SENSI-
TIVE DETECTORS
John M. McLauchlan, Pasadena, Calif., and Monty M.
Merlen, Stamford, Conn., assignors, by mesne assignments to the United States of America, as represented by the Administrator of the National Aeronautics and Space Administration
Filed Oct. 23, 1964, Ser. No. 406,097
14 Claims. (Cl. 250—83.3)

The invention described herein was made in the performance of work under a NASA contract and is subject to the provisions of Section 305 of the National Aeronautics and Space Act of 1958, Public Law 85-568 (72 Stat. 435; 42 U.S.C. 2457).

This invention relates to an improved horizon sensor or other device for scanning across the horizon of a planet and more particularly to horizon sensors of the type in which a mosaic array of spaced radiation detectors is sequentially sampled and, in ordinary operation, at least some of the detectors view space.

Horizon sensors are routinely used in satellites, rockets and other space vehicles which require a device for sensing their attitude with response to some planetary body. In the past for earth satellites a very effective type has been a conical scanning horizon sensor, a typical one being described and claimed in the Merlen Patent 3,020,407, Feb. 6, 1962.

Certain problems have arisen, particularly for horizon sensors to be used on vehicles which will be in space for a considerable length of time. One problem is presented by the presence of moving parts in a conical scan horizon sensor. For example, in the Merlen sensor referred to there is a rotating germanium prism. In the vacuum of space an extremely difficult problem is presented by moving parts because lubricants slowly evaporate. Another problem is presented by the fact that when a single detector is used it has to have a fairly fast response because its image is being scanned across a planet and it receives energy from any one spot for a very short time. Most detectors, and particularly infrared detectors, are much more sensitive if they have a slow speed of response. In fact the responsivity varies as the square root of the detector's time constant. Therefore, although it generally is more desirable to use slow detectors, the high response speed required of conical scan sensors precludes their usage.

Both of the above problems would be solved by a mosaic array of detectors along orthogonal axes. By electronically sampling the outputs of the detectors in proper sequence, scanning can be effected without moving parts. In addition, since the individual detectors in the array are not doing the scanning, detectors with extremely long time constants, as compared to the detector of a conical scan sensor, can be utilized.

However, sequentially sampled mosaic array sensors present a number of their own problems and have, therefore, not been as successful as their theoretical advantages would lead one to expect. One very serious problem is presented by reason of the fact that when infrared detectors view cold space, they will radiate out thereto. If the detectors' responsivities were identical, each detector would produce an output signal corresponding to its radiation loss to space. However, due to normal manufacturing tolerances, similar detectors may have responsivity differences of over 20%. These differences in responsivity result in different outputs being produced by the various space viewing detectors in an array. In the case of a horizon sensor being used to sense on the moon, the variation in signals due to the responsivity differences of the space viewing detectors could be much greater than the signal from the cold lunar surface. Under these conditions, proper recognition of the lunar horizon would not be possible and the horizon sensor's output would be erroneous.

In addition to the foregoing, there is another factor that contributes to non-uniform outputs from the space viewing detectors. With the wide field of view coverage normally required for horizon sensors, the radiation loss to space from each detector in the mosaic would be a function of its placement in respect to the sensor's optical axis, and the individual outputs of the space viewing detectors would correspondingly differ from each other.

One further serious problem involves changes of output signals from individual space viewing detectors in the array due to variations of the detector array's ambient temperature. In the case of an orbiting space vehicle, these temperature changes would be produced by the alternate exposure to and shielding from the sun of the vehicle by the planetary body being orbited. The radiation loss to space of the detectors in the array is a function of their absolute temperature, and any variations of the array's temperature causes a corresponding change of detector output signals. Therefore, the signals from the space viewing detectors would not only differ from each other for the reasons previously stated, but would also vary as a function of their ambient temperature changes.

It is also necessary to determine where during the scan planet horizon crossover occurs precisely since all sensors depend on accurate horizon sensing so that tilts may be measured. This is equally true of conical scanning single detector sensors and of mosaic arrays which have hitherto been used. Conical scan sensors require a fast response detector to determine accurately the time when during the scan the horizon discontinuity is traversed. Any variation of either detector speed of response or inherent time delays in the signal amplifier following the detector would produce errors in determining when horizon crossover occurred. In addition, differences in signal intensities of the leading and trailing horizon edges of the scanned planet also produce errors. A feature of the present invention eliminates any source of error from these factors and produces a sensor which operates accurately regardless of very low planetary signal, for example from the cold, dark side of the moon, and great differences in signal intensities across the planet. This latter is also accentuated in the case of the moon by the enormous difference in radiation when one crosses the terminator between the portion of the moon illuminated by sunlight and that which is in shadow.

The first problem, namely the differences in detector sensitivities in an array is solved by the present invention which requires only one limitation on the nature of the infrared detectors used in the arrays. This limitation is that the detectors must be of a type which give a zero output signal if the radiation received by the detector equals the radiation from the detector. At the present time there is one readily available type of detector which satisfies this requirement, namely thermocouples or thermopiles. The invention is not limited to the use of thermopiles as any other infrared radiation detector having the above characteristics can be used. However, because of their ready availability, simplicity, reliability and relatively low cost, thermopile detectors are the preferred modification of the present invention.

The solution of changing detector radiation and hence change in temperature is compensated in the present invention by providing a relatively small area, controlled, flat, heated radiation source positioned so as to provide each detector in an array with an amount of radiation that is equal to that which the detector loses when viewing space. Because the compensating radiation source can and usually will be at a substantially higher temperature than the detectors it can be quite small because of the fourth power of absolute temperature factor in radiation. Thus, if the compensating source is about a 100° C. hotter than the detectors its area may be of the order of magnitude of 10 percent of the entrance aperture of the instrument. There will, therefore, be no significant loss in detector response due to obscuration.

Reference has been made to the detector having a zero electrical output if the radiation from the detector to space is equal to the radiation which is received from the compensating heated radiation source. It should be understood that practical limitations on instrument design makes control to exactly zero output theoretically impossible. However, by using certain other precautions, which will be set out below, and by reason of the second feature of the invention it is possible to maintain uniformity to not more than plus or minus one microvolt output from any one detector. This extraordinary degree of compensation is one of the important advantages of the present invention and such extremely small range of outputs will be referred to throughout the specification and claims as "zero output." It should be understood that this term is used in its practical sense and not in a theoretical absolute sense. In order to obtain the high degree of precision in zeroing it is desirable to provide for a heat sink in thermal contact with the radiation detectors in an array so that individual detector temperatures will approximate the ambient temperature of the sensor without significant temperature differences between detectors. This permits the use of a single compensating heated radiation source for all of the uniform detectors in an array.

Compensation is effected by varying the temperature of the compensating heated radiation source automatically to restore the output of detectors viewing space to zero. The automatic control of the compensating heat source temperature may be effected by various means involving electronic circuits. There will be described in the specific description of the invention a very effective arrangement which constitutes a preferred embodiment.

The heating up or cooling down of the compensating radiation source need not be effected in an extremely short time. Thus, slower heating up may be used or one may consider this in another way of saying that the automatic control may have quite a long time constant which may be measured in seconds or even minutes. Of course, a shorter time constant may be used but as it is not necessary, the resulting complications and power problems may render it undesirable and so a relatively long time constant is preferred though, of course, the invention is not limited thereto. Because the compensating heated radiation source is used to offset the radiation loss to space, it will hereafter be referred to as "offset radiation source."

In order to economize as much as possible on power, always a vital factor in a space vehicle, it is preferable that the offset radiation source be located in the entrance aperture of the system and that a large portion of its radiation is directed toward the detectors which are to be compensated. This also permits a very small degree of obscuration of the detectors and hence does not significantly decrease their responsivity even to quite small infrared radiations such as are encountered, for example, in a horizon sensor which is to operate on the moon's disc. It is quite feasible with this design to keep the input power to the offset radiation source well under one-half watt. In other words, the great advantages of the present invention are obtained with insignificant power consumption even by the very severe power limitation standards of space vehicles.

Reference has been made to another problem in horizon sensors, namely a very accurate determination of when a horizon crossing occurs without requiring short time constant detectors and without serious effects due to wide variations in radiation from a planet disc. In the case of the moon, as has been mentioned above, this is of great importance because of the large difference between illuminated moon disc and unilluminated moon disc. For use with planets having an atmosphere the further effect of cold clouds near the horizon is also minimized in the present invention because precision of determining horizon crossing is effected by a digital operation so that the number of counts, that is to say detectors sampled, is used to determine when a horizon crossing occurs rather than the signal amplitude at a particular instant of time.

Achieving this digital rather than analogue operation involves no serious problems. No moving parts are required, thereby permitting long term operation to be achieved. Also, light weight electronic counter and sampling circuits can be constructed that only require moderate power.

In order to enjoy the maximum benefit from the digitalization it is desirable to sample each array beginning from space and sampling and hence counting from detectors viewing space toward the first detector which encounters a planet horizon. Tilt of a space vehicle can then be determined by using a plurality of scanning heads and comparing the number of counts to horizon crossings at the output from each head. The reliability of the determination of position of horizon cross-over is within one count. With a reasonably large number of detectors in the array high precision can be obtained. The invention is, of course, not limited to any particular number of detectors but for high precision horizon sensor work approximately 90 detectors in each array are capable of giving as high resolution as is needed.

Since digitalized operation means that a particular detector output will either be zero if it is looking at space or some minimum value of a particular phase, for example positive, when viewing the planet, the exact amount of radiation received from the planet is of complete indifference since the detector will either register as being on or off the planet so long as the radiation received is above or below a certain very low level. This may, for example, be only one or two microvolts of detector output and the responsivity of thermopile detectors and precision of zeroing provided by the offset radiation source is amply sufficient so that even the radiation from the dark portion of the moon is quite enough to register accurately as a positive count, without being confused by any small residual output variations from the space viewing detectors.

Determination of tilt by comparing the number of counts from space to horizon cross-over can be made in conventional electronic circuits which are relatively quite simple. As the present invention is in no sense concerned with any particular known comparison circuit they will not be illustrated or further referred to in the specification except to point out that it is an advantage of the invention that it can be used with simple known and reliable circuits.

It should be noted that with the digital count feature of the present invention the location of the horizon is determined with an accuracy of one count regardless of the magnitude of the difference between the radiation on both sides of the horizon cross-over. This is of great importance as compared to a conical scan sensor using a single detector in which the energy difference in the radiation from the two sides of the horizon crossing is an important factor in the degree of accuracy of horizon location determination. As long as there is enough energy radiated from the planet so that there will be a positive response from a detector receiving it as compared to space the sensor of the presence invention will operate with the same accuracy on the moon as on a much warmer planet such as the Earth or Venus.

It should be noted that the feature of compensating radiation source is not limited to the digital feature of the invention. It will perform its function even though determination of horizon crossings were obtained by electrical analog methods because the compensation for radiation to space will be obtained regardless of whether digital or analog means for horizon crossing location are employed. However, because of the great advantage of the digital feature it is preferred to use the radiation compensation in combination with digital treatment of the signals from the various detectors sampled and this combination of both features presents such great advantages that it is by far the preferred embodiment of the present invention.

Sequential sampling involves counting circuits and sampling switching means. It is preferred to use a master pulse oscillator of conventional design with a counting circuit which in each cycle will sequentially sample all of the detectors in one array. With 90 detectors this counting circuit may have 100 counts, the additional 10 counts being used to perform other desirable functions, some of which are included in the present description. For simplicity in the description of a specific horizon sensor a 100 count counter will be described. It should be understood that these counting circuits are conventional electronic circuits and the invention is not limited to any particular design. As a matter of fact in an actual commercial instrument a well known counter modification of using two circuits in decades is actually incorporated. As this only complicates the description and has nothing to do with the basic features of the present invention the simpler counting modification will be specifically described even though it is worthwhile in commercial instruments to employ the more sophisticated, but equally well known, decade counters. Sampling of successive detectors is a necessary element in an operative instrument according to the present invention but the invention is in no sense limited to particular sampling circuits and any suitable circuit may be used. However, certain requirements must be met and so these requirements merit brief discussion. The radiation received by individual detectors in an array may be very small, particularly in the case of a sensor to be used on the moon. This requires extremely low noise switching at this low level point. Various substantially noise free or low noise switching circuits may be used. A very simple one involving light triggered switching will be described in the specific description. The invention is, of course, not limited to this method of switching which is described and claimed in the copending application of Frank Schwarz, Ser. No. 263,609, filed Mar. 7, 1963, now United States Patent 3,211,512. Other noise free or low noise switching circuits may also be used such as, for example, the circuit described and claimed in the application of Wayne Chou, Ser. No. 199,290, filed June 1, 1962, now United States Patent 3,233,121. These latter switching circuits, though presenting some important advantages, are somewhat more complex and as the particular low noise switching does not form any part of the present invention the simpler system of the Schwarz application will be used as a typical example. All that is required is that the switching be sufficiently low in noise so that switching noise remains below the threshold of signal from a planet.

As the specific description of the invention involves a uniform and effective horizon sensor there will be described certain features which are not claimed herein, but which are included to clearly describe the novel features of the invention. Thus, for example, by means of reliable circuits including a stair step generating circuit the horizon crossing may be indicated only if more than one detector in sequence receives radiation from the planet, for example, five detectors. This permits, without affecting the major advantages of the offset radiation source, which is the most important single part of the present invention, the elimination of response from a body like the sun which may be encountered in part of a space scan. This is an enormously powerful signal but geometrically it is a very narrow signal and at most it can strike two detectors. The response of the signal to indicate horizon cross-over location only takes place after five adjacent detectors have received a positive signal. Spurious results from the sun or any other intense radiation source of very small angular dimensions which would encounter at most one or two adjacent detectors are ignored and do not in any way interfere with the other advantages of the invention. It will thus be seen that the digitalization feature of the present invention makes possible an additional advantageous result. Five successive detector responses have no particular quantitative significance in themselves. Any number more than two would perform the same additional function of eliminating spurious signals from the sun. Five, however, is a very convenient number and has been chosen in the first commercial instrument because this also eliminates spurious signals from the earth in the case of a horizon sensor operating near the moon.

It is desirable to operate the offset radiation source control primarily from detectors which normally would be viewing space, as this permits the most accurate control since detectors which would normally encounter radiations from a planet would have a different radiation intake. Accordingly, while it is not broadly a limitation of the present invention, an advantageous preferred modification involves the actuation of the control circuits for the offset radiation source only from a limited number of detectors which are first encountered in the scan through space. In this preferred modification, a sampling circuit may advantageously make connection to the offset radiation source heater power control circuits only when sampling the first ten detectors of each array. The radiation source is of fairly substantial thermal capacity in comparison to the length of time represented by one sampling cycle which can advantageously be quite small, a fraction of a second. Therefore, no significant deterioration in accuracy of the offset radiation source temperature control results from sampling only some of the detectors of a full array. As a matter of fact when the instrument first starts it takes quite a few scan cycles before the offset radiation source has been warmed up to the point where it produces complete compensation.

For simplicity of design it is desirable, although not essential, to operate the control of the offset radiation source only when the detectors are relatively too cool, in other words, only to heat up the offset source and interrupt the heating when it has reached balance. When this additional simplification is used it is also desirable, although not absolutely essential, to prevent the control source from responding to signals of the reverse polarity, for example, positive signals instead of negative going signals. This additional refinement can easily be provided by a simple diode.

It is also usually desirable to turn on the offset heater control circuit with the first detector which shows a signal that would correspond to space. This makes it desirable to incorporate in the control circuits a level holding amplifier which will keep the heat supplied during the sampling time for the first ten detectors and then for the rest of the scan. Such a refinement will be described in the specific description and is an advantageous though not absolutely essential feature.

The invention will be described in greater detail in conjunction with the drawings in which:

FIG. 1A is a diagram useful in explaining the invention;

FIG. 3 is a cross sectional view of the optics, incorporated in each head;

FIG. 4 is a block diagram of one head and the circuitry associated therewith;

FIG. 5 is a section of a portion of the switching matrix;

FIG. 7 is a partial schematic of some of the circuits.

Figure 1:
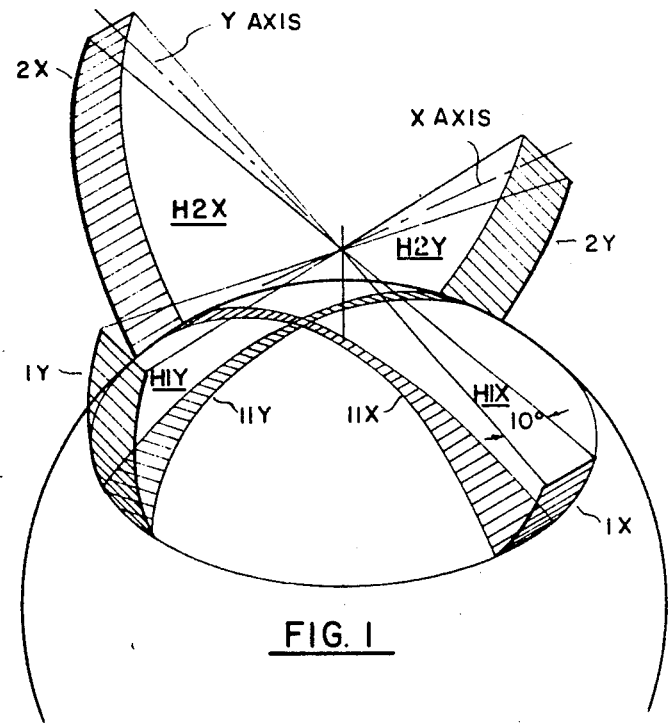
FIG. 1 is an isometric drawing of the effective scan paths on a planet.

FIG. 1 shows the scan paths of four heads H1X, H2X, H1Y and H2Y. Heads H1X and H2X are for the X axis and H1Y and H2Y for the Y axis. The drawing is diagrammatic and there are actually 90 detectors in each head. The width of the view of a single detector is 10°. The first detectors in heads H1X and H2X are shown at (1X) and (2X) respectively. The corresponding detectors for heads H1Y and H2Y are (1Y) and (2Y). The remainder of the detectors are shown at (11X) and (11Y). The scan paths shown in FIG. 1 indicate a tilt about X and Y axes of somewhat exaggerated degree. It will be noted that in the case of the X axis there is a very serious tilt with many more detectors (2X) seeing space than the corresponding detectors (1X). The Y axis is not so badly tilted so that the difference in numbers of the detectors seeing space is less.

FIGURE 1A is a simple diagram in which are shown only heads H1X and H2X, positioned about the X axis which is in turn diagrammed with respect to a horizon line of a planet. For simplicity, each head is shown including a detector array in which 90 detectors are arranged to form an angle α. Dashes lines $11X_a$ and $12X_a$ represent lines of horizon cross-over. It should be apparent that in the particular diagrammed case, in head H1X only the detectors in the detector array segment $11X_b$ receive radiation from the planet, while in head H2X, only the detectors in segment $12X_b$ receive radiation from the planet. All the other detectors in both heads see space. By sequentially scanning the outputs of the detectors in each head, the orientation of the horizon line with respect to each head can be determined, thereby determining the relative orientation of the horizon line with respect to the X axis.

Figure 2:
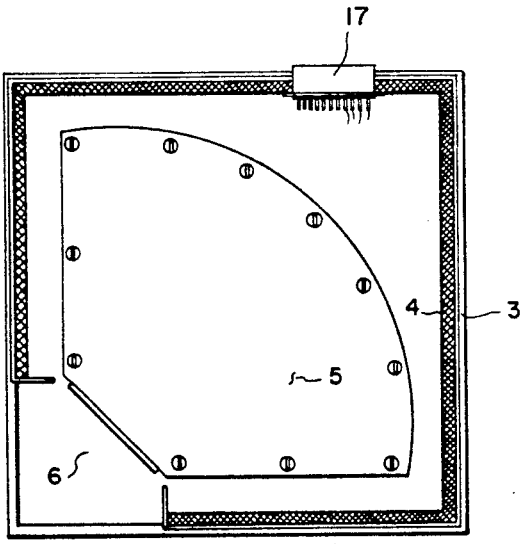
FIG. 2 is a section through one scanning head.

FIG. 2 shows a section through one of the four scanning heads which are in the form of cubes with one corner cut off to form a window through which the head looks down at a predetermined slant with respect to the vertical line in the vehicle when it is in ordinary balanced attitude. The head has a metal housing 3 with insulation 4 and a framework 5 which supports the optics as will be described below. The window, which may be of silicon for far infrared radiation, is shown at 6 and the switching matrix at 17. The latter will be described in somewhat more detail in connection with FIGS. 4, 6 and 7. The two scan axes are defined by means of the positioning of the four heads on the sides of the vehicle. This arrangement of heads does not constitute the present invention but is required in order to effect the proper scan paths.

FIGURE 3 illustrates the optics in each head covered by the plate 5 (FIG. 2). The optics includes a spherical mirror 7 which receives radiation as is shown in FIG. 3 through the entrance aperture which is defined by an aperture plate 9 (see FIG. 3). Located in the entrance aperture is the infrared transmitting window 6 (FIG. 2), which reduces the contrast of incoming radiation by selective spectral filtering. The mirror 7 and entrance aperture 9 comprise an uncorrected Schmidt optical system, which has a 10° x 90° field of view sharply focused onto the detector array mounted on a bridge 8. Approximately 10% of the clear entrance aperture 9 is obscured by an offset radiation source 10. It will be noted that this offset source is located just inside the window close to the center of curvature of the mirror. The offset source is only 10 percent the size of the entrance aperture and, therefore, does not obscure to a serious extent. Its use will be set forth in more detail in conjunction with the operation of the scanner which will be described with reference to FIGURES 4, 6 and 7. FIGURE 4 is a simplified block diagram of the detectors of one head and the circuitry associated therewith. Briefly, the detectors are positioned to receive radiation which may come either from a planet or space. Such radiation is designated as "Incoming Radiation." The detectors also respond to radiation or heat from the offset radiation source 10, designated to provide sufficient heat energy, so that the output of each detector looking into space is substantially zero, but not greater than a predetermined threshold level such as 1μ v. The outputs of the 90 detectors designated $D_0$ through $D_{90}$ are connected to respective switching cells in a photo commutator 17 which includes a commutator circuit 17X. Briefly, during a scanning cycle, consisting of 100 pulses supplied to 17 at ⒺⒺ, the first 90 pulses are used to sequentially actuate each switching cell and the circuit 17X so that the output of each detector is sequentially supplied to a horizon detection circuitry. Only when a preselected number of successive detectors provide outputs indictaing that they all receive radiation from a planet is an output of a given level provided by the horizon detection circuitry. Also, the outputs of the first few detectors in each scan cycle are used to control an offset radiation source control circuit 10X which in turn controls source 10 so that the radiation supplied to the detectors causes those detectors seeing space to provide substantially zero outputs.

FIG. 5 shows a single switching or sampling cell with active cadmium selenide cell 37, two small neon bulbs 38 having mirrored rear surfaces 39 and glow regions 40. There is a cadmium selenide cell for each radiation detector which, in the drawings, are designed to be thermopiles. The use of two neon bulbs is to effect redundancy where the horizon sensor is to be used with a vehicle that has to operate for many months in space. The sensitivity of the cell area 37 is such that it is actuated if only a single neon bulb lights. The bulbs are in parallel and should one burn out switching will still take place.

The scan operation can be understood in connection with FIGS. 1 to 6, the last one showing the circuits for the four scanning heads. As the circuits are the same for each head until the tilt readouts (not shown) are reached, they will be given the same numbers. A master oscillator or clock 23 (FIG. 6) drives the one hundred count ring multivibrator or counter 24. The outputs Ⓔ of the counter 24 are used to fire sequentially the neon bulbs which illuminate the light sensitive cadmium selenide cells in the commutator 17 one at a time in proper order.

At the start of a scan cycle or scan the first pulse from the clock 23 (FIG. 6) actuates the first stage of ring counter 24, which causes sampling of the first detector. This will be referred to as count zero. Subsequent clock pulses sequentially actuate the remaining stages of the ring counter.

Figure 6:
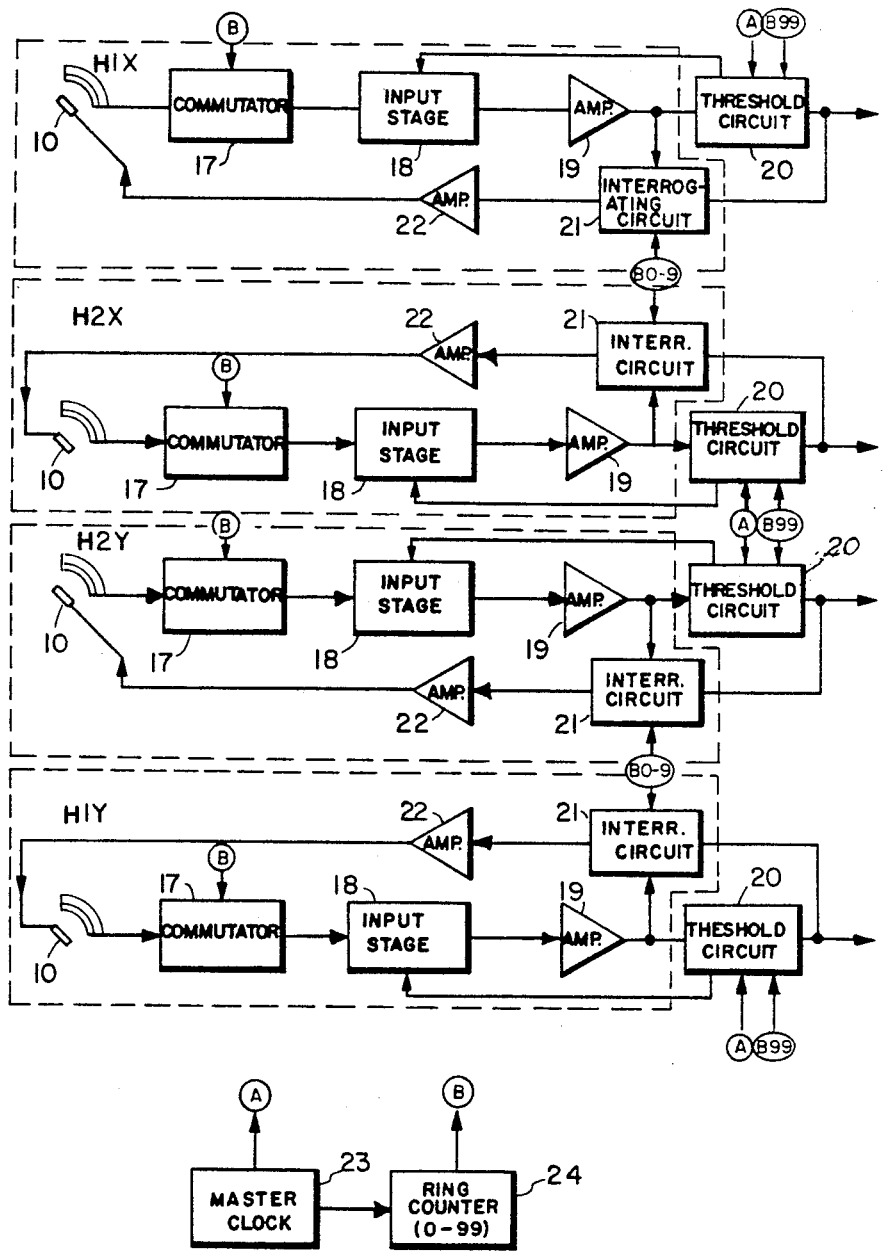
FIG. 6 is a block diagram of the electronic circuits.

The hundred and first clock pulse brings the ring counter back to the zero count position. The one hundred outputs of the counter 24, during each scan cycle are shown going to the points marked B of commutators 17 (FIGS. 4 and 6). Each commutator, as described in conjunction with FIG. 4, consists of a series of cadmium selenide cells (one of which is shown in FIG. 5) whose resistances are effectively infinite until illuminated by the associated neon bulb at which time their resistances decrease towards zero ohms. There is a separate compartment with individual neon bulbs and cadmium selenide cells for each thermopile detector.

The commutator 17 (FIGS. 4 and 6) first switches in the detectors at the space end of each array, in other words, the thermopiles shown at (1X) and (1Y) and (2X) and (2Y) of the four heads respectively in FIG. 1. As seen from FIG. 7 to which reference is made herein, in each channel, the outputs of the successively sampled thermopiles pass through a switch 13 and a capacitor 14 of an input stage 18 to an amplifier 19. Switch 13 is referred to as "0–1" switch because in the "0" position no signals pass through the switch and the input to amplifier 19 (FIG. 7) is referenced to ground while in the "1" position, signals are passed through unattenuated into the amplifier 19. Thus, signals from the commutator are being effectively multiplied by 0 or 1, depending on the switch position, at all times. At the start of each scan the switches 13 of the four input stages 18 (FIGS. 6 and 7) are flipped into the (1) position as will be described below and so pass signals into the amplifiers 19, the outputs of which pass into threshold circuits 20.

These threshold circuits 20 (FIGS. 6 and 7) also receive pulses from the clock 23, as shown by the letter A, and the ring counter 24, as shown by the letter B. The counter 24 also feeds pulses (B0-9) to interrogating circuits 21 (FIGS. 6 and 7). These 10 pulses (B0-9) are provided to the interrogating circuit 21 associated with each head, when the first 10 detectors of each head are scanned, connecting the output of amplifier 19 to an associated amplifier 22. Interrogating circuit 21 and the amplifier 22 form the control circuit 10X, shown in FIG. 4. Whether the temperatures of the offset radiation sources 10 (FIGS. 6 and 7) are adequate to cancel out the loss of heat to space from the thermopiles is then determined. If the cancellation is correct, that is, the output of a detector looking into space is zero, the output of each amplifier 19 will effectively be zero and correspondingly, the input power to the offset radiation sources 10 from amplifier 22 will be zero. Reference has been made above to a steady supply of heat for normal operation and this is not affected by the zero signal coming into the input of the amplifier 22. However, a negative polarity signal, from amplifier 19 due to the sampled detectors losing more radiation to space than they are receiving from the offset radiation sources 10 would pass through diode (FIG. 7) and be amplified by the amplifiers 22, and produce voltages across the heaters of the offset sources 10.

If the offset radiation source 10 is either not hot enough or too hot, there will be either signals which add to the voltage in the heaters of the offset radiation source or will provide no heating power, permitting it slowly to cool off. The operation of the horizon sensor will be described in more detail in connection with FIG. 7 which shows in partial schematic the circuits associated with one head. In FIG. 7 the various blocks on FIG. 6 will be indicated in dashed lines with the components shown. Hereafter, reference is made only to FIG. 7, unless otherwise indicated. The amplifier 22 will be repeated without schematic showing as it is a conventional type of amplifier. As shown in FIG. 4, the photocommutator 17 includes the commutating circuit 17X which is provided with a series of switch points for the 90 detectors and an additional 10 positions. In FIG. 7, only circuit 17X is shown included in photocommutator 17, the switching circuits being purposely excluded to simplify the drawing. The labelling of the points corresponds to the detectors and the other 10 positions are labelled 90 to 99. Only the first three detectors are shown in solid lines and the last three with dashed line detectors to indicate those between. When the counter 24 is at count zero it will have switched in detector number zero followed in sequence by 1, 2, etc., until all of the 100 positions have been switched in. In FIG. 7 the commutator 17 is shown as switched to the second detector viewing space which is labelled 1. At this time the 0-1 switch 13 is in the position connecting the input of amplifier 19 to detector 1. At balance the net signal, that is to say radiation from the detector to space is compensated by the radiation from the offset radiation source 10. The signal is amplified by amplifier 19, passes through a 5 μfd. capacitor 26 into a differential amplifier 29 which also receives an input from the reference voltage 37. This reference voltage corresponds to plus 1 μ volt at the detector outputs. It should be noted that the capacitor 26 is connected at one end to a low valued resistor 27 which has its other end switched to ground by the switch 28. The capacitor 26 and resistor 27 form a short time constant input to the differential amplifier 29. The signals produced when switching from one detector to another are amplified by amplifier 19 and fed through coupling capacitor 26 into amplifier 29. The short time constant referred to above eliminates responses to slow changing potentials in the output of amplifier 19 due to low frequency spurious signals or noise. As long as the output of the detector being sampled is below that which would produce an input to the amplifier 29 more positive than the reference voltage, the output of this amplifier will either be zero or negative, and the switch 28 is so arranged that it will only be actuated by a positive signal therefrom.

On crossing the planet horizon there will be a positive signal in the output of amplifier 29. This actuates switch 28 and causes the capacitor 26 together with the high input impedance of the amplifier 29 to form a very long time constant, which permits subsequent positive signals to be passed without any excessive "droop" or distortion, which would occur if the time constant were permitted to remain short.

Amplified positive signals from detectors viewing a warm target appearing at the output of the amplifier 29 also open a gate 30 which then passes timing pulses received at Ⓐ from the oscillator or master clock 23 shown in FIG. 6. Each positive pulse is passed to the staircase generator 31 and if the ouput of amplifier 29 remains positive for at least five counts the staircase generator will produce an output voltage sufficiently high to cause the flip flop 32 to be actuated to its second stable position. This puts a signal on the 0-1 switch 13, switching it into the zero (0) position which connects the input of amplifier 19 to ground. The flip flop also produces a gating signal output which in conjunction with the ring counter 24 and oscillator 23 outputs can be utilized in subsequent conventional summing and comparison circuits to produce tilt and altitude readouts or drive signals for vehicle positioning servos. As these latter circuits are of the same nature as in ordinary horizon sensors, except that they are adapted to digital actuation, they are not shown because they are not changed at all by the present invention. The flip flop 32 also sends an actuating signal to ground clamp switch 33 in the interrogating block 21. The flip flop then remains in its second stable position until the completion of the scan cycle. At the end of the scan cycle, indicated by a pulse B99 from counter 24 (see FIG. 6), flip-flop 32 is reset. As a result, switch 33 is ungrounded (as shown) and similarly switch 13 is switched to the 1 position (as shown).

After 90 detectors have been sampled, the next five commutator positions, 90 to 94, are connected to a positive voltage source. This assures that there will be positive signals going into the staircase generator gate 30 as described above in connection with the horizon crossing, even though the sensor may not see a planet at all. These five positions might, therefore, be considered as acting like a synthetic planet, and assure that there will be a normal scan cycle with a horizon crossover even though the sensor may temporarily have lost the planet as previously stated, the 100th count of the counter 24 (FIG. 6) is used as a reset input (labelled B99), to the flip flop 32. The blank positions B95-99 give time for circuit stabilization.

Let us now assume that one or two detectors which would ordinarily view space encounter the sun or even, in the case of operation of the sensor near the moon, the earth. This produces a relatively short pulse which changes the time constant by means of the switch 28 as described above, and also opens the gate 30. However, because of the small angular subtense of the spurious body being viewed, the gate does not remain open for the necessary five counts and when the next detector viewing space is switched in there is a signal below reference present at the input of amplifier 29. Switch 28 is now reset to provide a short time constant and the staircase generator is discharged through the diode 41. This then restores the circuit to the condition of again waiting for horizon crossover for five detector counts to occur.

The 0-1 switch and the threshold components in block 20 involve features which, while desirable, are not the subject matter of the present invention. They are, however shown in FIGS. 6 and 7 because, otherwise, the description would not be of a fully operative horizon sensor of the best form. They do not constitute the main subject matter of the present invention, namely the offset radiation source, and are not intended to limit the invention.

Although most of the elements in block 20 are not essential to the present invention it should be pointed out that the operation of the changing time constants in the input of the amplifier 29 perform valuable functions as they eliminate spurious low-frequency signals such as, for example, the gradual change in signal output from detectors and they prevent a spurious horizon indication if noise were superimposed on a difference in signal due to detector variations. The offset radiation source is set only by the outputs of the first 10 detectors. This is desirable but it is not intended to limit the invention thereto, as it is perfectly possible for the compensation to extend over more detectors, and it is also possible, but because of the additional complication normally undesirable, to use both heating and cooling means for the offset radiation source. Such more complicated modifications are not shown in the present specification which describes specifically the preferred modification.

In FIGS. 1 to 5 catoptric collecting optics are shown. Since the invention has nothing to do with the particular design of optics, except that they must have an entrance aperture and the offset radiation source be correctly located therein, it makes no difference what the design of optics is. Thus, in FIG. 7 a diagrammatic showing of a lens 42 appears. This illustrates another typical form of optics.

Summarizing briefly, in accordance with the present invention, a horizon sensor is provided which includes at least one multidetector head fixedly positioned with respect to an axis in the vehicle in which the sensor is positioned. Each head is provided with an offset radiation source which provides energy to the detectors so that those that see space provide a substantially zero output. The energy provided by said source is controlled by monitoring the outputs of the first few detectors assumed to look into space. The outputs of the detectors are sequentially scanned. Only when a selected number of successive detectors provide output signals above a selected threshold, indicating that each receives energy from a planet is a horizon detection signal supplied.

It is appreciated that those familiar with the art may make modifications in the arrangements as shown without departing from the spirit of the invention. Therefore, all such modifications are assumed to fall within the scope of the appended claims.

We claim:

1. In a horizon sensor having a plurality of scanning heads fixedly positioned about orthogonal axes each head having a large number of fixedly positioned infrared radiation detectors of the type which produce a zero output signal when radiation into the detector equals radiation from the detector, optical means for imaging infrared radiation onto the detectors, said means imaging radiations from space on a plurality of detectors when the horizon sensor is oriented in the position corresponding to level vehicle attitude, electronic processing circuits and means for selectively and sequentially switching the detectors into the input of said electronic circuits, the improvement which comprises,
    (a) a radiating surface occupying a very small portion of the entrance aperture of the optical means located so that the surface is seen by the detectors, and
    (b) means actuated by the output signal from at least one detector viewing space to change the temperature of the radiating surface until its radiation to the detector equals the radiation from said detector to space.

2. An improved horizon sensor according to claim 1 in which the radiation detectors are thermovoltaic detectors.

3. An improved horizon sensor according to claim 2 in which the radiation detectors are thermopiles.

4. A horizon sensor according to claim 1 comprising means, actuated at the end of a scan, for resetting all circuits to initial space detector viewing condition.

5. A horizon sensor according to claim 1 in which the means for changing the temperature of the radiating surface actuated by a smaller number of detectors normally viewing space than that corresponding to the number to horizon crossing in normal operation is level vehicle attitude.

6. A horizon sensor comprising:
    at least one multidetector head fixedly positioned with respect to a reference axis, said head including a plurality of radiation detectors, each adapted to receive radiation energy or radiate energy into space, and providing a potential output as a function thereof;
    first means for controlling the radiation surfaces of said detectors whereby the outputs of detectors radiating energy into space are substantially equal to zero, and below a predetermined threshold level;
    second means for providing a sequence of control pulses defining a scanning cycle;
    third means responsive to said control pulses for sequentially sensing the outputs of said detectors;
    fourth means coupled to said third means and responsive to the sequentially sensed outputs for providing a horizon sensing signal when the sensed outputs of a predetermined number of successive detectors are above a preselected threshold level; and
    fifth means responsive to said third means for controlling said first means as a function of the output of at least one of said detectors radiating energy into space.

7. The horizon sensor as recited in claim 6 wherein:
    said first means includes a radiating surface positioned in relation to said detectors;
    an amplifier having an output coupled to said radiating surface and an input selectively coupled to said third means when the outputs of a preselected group of detectors are sensed, to control the energy radiated by said surface whereby the outputs of detectors radiating energy to space are substantially equal to zero.

8. The horizon sensor as recited in claim 7 wherein:
    said fourth means include switching means for decoupling said fourth means from said third means in response to said horizon sensing signal until the start of a subsequent scanning cycle.

9. The horizon sensor as recited in claim 8 wherein:
    said third means includes means coupled to a source of positive potential for providing to said fourth means during a preselected number of the last control pulses in said cycle, sensed outputs above a preselected threshold level, to control said fourth means to provide said horizon sensing signal.

10. The horizon sensor as recited in claim 8 wherein:
    said fourth means includes a third amplifier having input circuit means coupled to the switching means and an output coupled to said input circuit means, to vary the impedance characteristics thereof as a function of the level of the output of said third amplifier.

11. The horizon sensor as recited in claim 6 wherein:
    said third means includes a first amplifier for sequentially amplifying the outputs of said detectors supplied thereto, and said first means includes a radiating surface positioned in relation to said detectors and a second amplifier having an output connected to said radiating surface;
    an input and means for selectively coupling the output of said first amplifier to the input of said second amplifier when the outputs of a preselected group of detectors in said head are sensed, to control the output of said second amplifier so that said radiating surface radiates energy to said detectors, whereby the outputs of detectors radiating energy into space is substantially zero.

12. The horizon sensor as recited in claim 11 wherein: said fourth means includes switching means for decoupling said fourth means from said third means in response to said horizon sensing signal until the start of a subsequent scanning cycle.

13. The horizon sensor as recited in claim 12 wherein: said third means includes:
means coupled to a source of positive potential for providing to said fourth means, during a preselected number of the last control pulses in said cycle, sensed outputs above a preselected threshold level, to control said fourth means to provide said horizon sensing signal.

14. The horizon sensor as recited in claim 13 wherein: said fourth means includes:
a third amplifier having input circuit means coupled to the switching means and an output coupled to said input circuit means, to vary the characteristics thereof as a function of the level of the output of said third amplifier.

References Cited

UNITED STATES PATENTS

| | | | |
|---|---|---|---|
| 2,989,636 | 6/1961 | Lieb | 250—83.3 |
| 2,999,161 | 9/1961 | Lovoff | 250—83.3 |
| 3,211,912 | 10/1965 | Schwarz | 250—209 |
| 3,237,010 | 2/1966 | Elliot et al. | 250—83.3 |

ARCHIE R. BORCHELT, *Primary Examiner.*

RALPH G. NILSON, *Examiner.*

ALAN B. CROFT, *Assistant Examiner.*